Nov. 15, 1960 M. C. BARTZ 2,960,155
AFTERBURNER FUEL METERING CONTROL
Filed May 26, 1953 2 Sheets-Sheet 2

INVENTOR.
MELVIN C. BARTZ
BY
M. A. Hobbs
ATTORNEY

United States Patent Office 2,960,155
Patented Nov. 15, 1960

2,960,155

AFTERBURNER FUEL METERING CONTROL

Melvin C. Bartz, South Bend, Ind., assignor to The Bendix Corporation, a corporation of Delaware Filed May 26, 1953, Ser. No. 357,430

8 Claims. (Cl. 158—36)

The present invention relates to fuel control devices and more particularly to devices for supplying fuel to afterburners for gas turbine engines.

In the past it has beeen the practice in afterburner fuel systems to utilize a pump capable of maintaining a comparatively high, closely regulated pressure across a variable orifice. This method of control has generally resulted in undesirable size and weight of apparatus coupled with limited accuracy of measurement. The pump used has necessarily been of precise and hence, costly, design. It is, therefore, an object of the present invention to provide an afterburner fuel control capable of accurately metering fuel at relatively low pressures over a wide range of fuel flow.

It is another object of the present invention to provide an afterburner control which is capable of giving rapid response to requests for change in fuel flow.

It is another object of the present invention to provide a control which continually corrects fuel flow values to comply with changes in external operating parameters.

It is a further object to provide a device which is simple in structure, light in weight, yet highly reliable.

Other objects and advantages will be readily apparent from the following detailed description taken in connection with the appended drawings in which.

Figure 1:
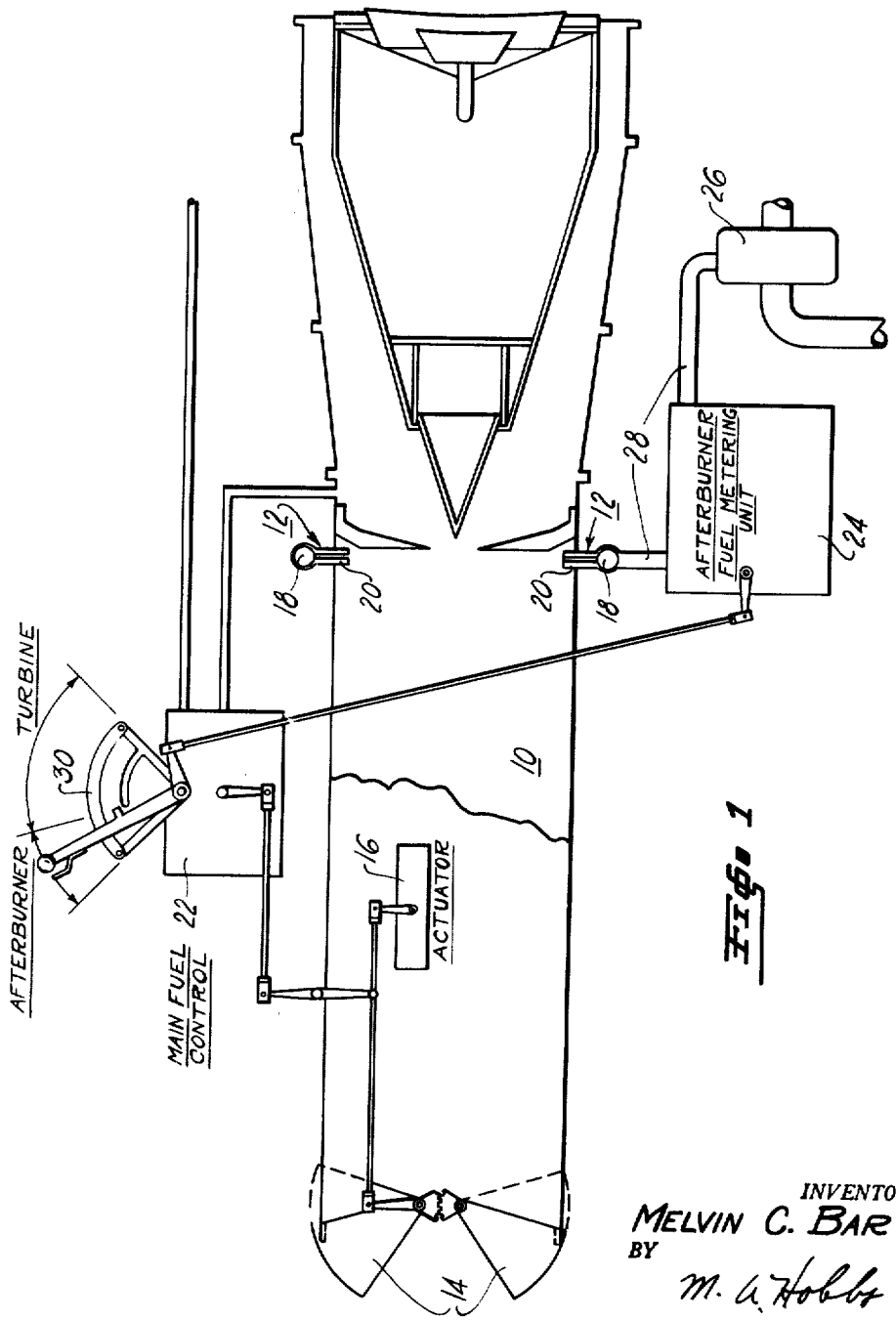
Figure 1 is a block diagram showing part of a gas turbine engine and the relationship of my afterburner control to the engine and to other parts of the control system.

With reference to Figure 1, numeral 10 represents the tail section of a gas turbine engine equipped with an afterburner 12 and a tailgate 14 with an actuator 16. The afterburner manifold is shown at 18 with nozzles 20. A main control unit 22 regulates fuel to the turbine and coordinates the action of the tailgate actuator 16 with that of the afterburner control 24. Fuel is supplied from a source (not shown) to a pump 26 which constantly maintains a low line pressure to the afterburner control through a main fuel conduit 28. A throttle 30 is operatively connected to the main control system 22 and to the afterburner control 24 which is in operation only during the portion of the throttle quadrant beyond the maximum range of the main turbine.

Figure 2:
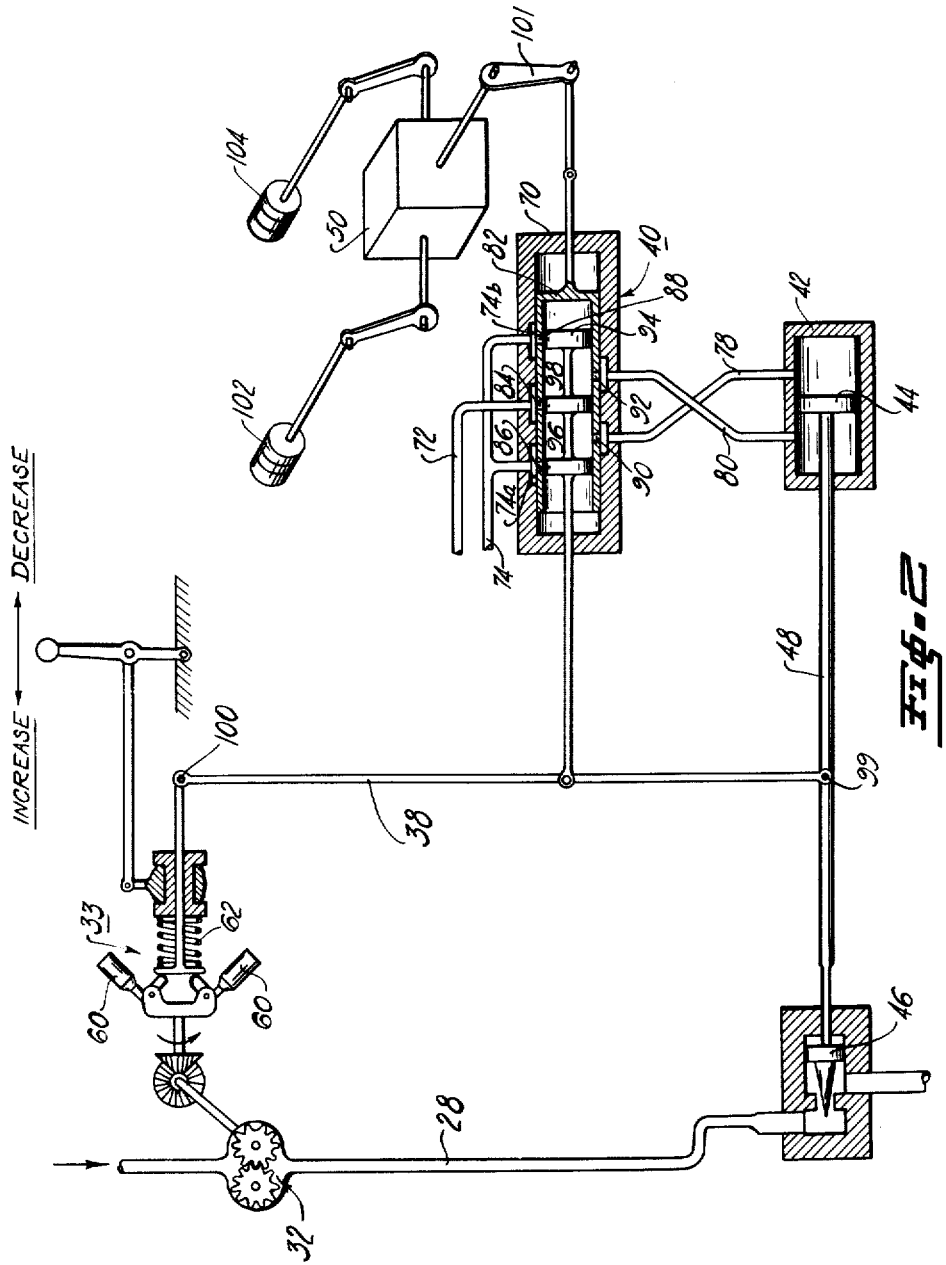
Figure 2 is a schematic diagram showing the general arrangement of the parts of my fuel regulating device.

Figure 2 shows schematically the components of afterburner control 24, wherein fuel is supplied under comparatively low pressure to conduit 28 in which is placed a constant displacement flowmeter 32 capable of measuring a quantity of fuel passing through it as a function of its rotational speed. Flowmeter 32 drives a governor and throttle assembly 33. Changes in throttle setting are translated through link 38 to a servo valve 40 which controls the flow of fluid to a cylinder 42 in which is disposed a piston 44. Movement of the actuating piston is translated through a link 48 to valve 46, which controls the amount of fuel passing through conduit 28. This flow may be modified by introducing into servo valve 40 a signal from a pressure and temperature compensating differential 50.

The governor assembly, driven by flowmeter 32, consists of a conventional flyball construction as shown at numeral 60, which exerts a force opposed by a spring 62. Movement of the throttle 30 in either direction will increase or decrease the compression on spring 62 which in turn throws the system out of balance resulting in the translation through link 38 of a positional change to servo valve 40.

Servo valve 40 consists of a housing 70 having inlet passage 72 for a source of fluid under pressure, outlet passages 74a and 74b of conduit 74 for returning the fluid to its source, and passages 78 and 80 connecting the valve to cylinder 42 on opposite sides of actuating piston 44. Disposed in housing 70 is a sleeve valve 82 the hollow interior of which is connected by a port 84 to inlet passage 72, by ports 86 and 88 to outlet passages 74a and 74b and by ports 90 and 92 to passages 78 and 80, respectively. The passages in housing 70 have enlarged portions adjacent sleeve valve 82 to permit said valve to reciprocate without disrupting communication between the corresponding passages. Slidably positioned within said sleeve valve is the multiple spool link or piston 94. Movable chambers 96 and 98 are formed between the lands of the piston 94 and within sleeve valve 82. Movement of the throttle in the direction of increasing fuel flow moves the piston to the left, causing chamber 98 to align itself with fluid inlet passage 72 and port 84, and chamber 96 to become aligned with port 86 and outlet passage 74a. Fluid will then flow from inlet passage 72, through port 84, chamber 98, port 92, passage 80 and into the left side of cylinder 42, thus forcing actuating piston 44 and consequently, valve 46, to the right. Fluid to the right of the piston is forced through passage 78, port 90, chamber 96, port 86 and outlet passage 74a. Movement of the throttle in the direction of decreasing fuel flow moves piston 94 to the right of its position as illustrated, at which time chamber 96 will be aligned with inlet passage 72 and port 84, and chamber 98 with port 88 and outlet passage 74b. Fluid will then flow from inlet passage 72, through port 84, chamber 96, port 90, passage 78, and into the right side of cylinder 42 thus forcing piston 44 to the left and moving valve 46 in a closing direction. Fluid on the left side of cylinder 42 is then forced out through passage 80, port 92, chamber 98, port 88, and outlet passage 74b.

It will be noted that upon initial movement of the throttle 30 a motion is translated to link 38 tending to rotate it about point 99 and moving piston 94 in servo valve 40. The resulting movement of actuating piston 44 causes point 99 to be moved laterally, resulting in a rotation of link 38 the next instant around its upper end, point 100. This motion also causes piston 94 in servo valve 40 to be moved back toward the position which it occupied before movement of the throttle, thus tending to stop any further flow to chamber 42. This rotation of link 38 around point 100, results in a follow-up correction which acts almost immediately to prevent overshooting of the desired valve position.

Sleeve valve 82 is connected through a linkage system 101 to a compensation differential 50 which may be any one of several known electrical or mechanical types. This compensation differential coordinates the information fed to it from a temperature bellows 102 and pressure bellows 104, both of which might be located in the compressor inlet passage. The combination signal from said differential 50 is used to move sleeve valve 82 and hence, the ports on its sidewalls relative to the position of multiple spool piston 94, thereby altering the time relationship of the fluid flowing into cylinder 42 against actuating piston 44 according to changes in temperature and/or pressure sensed. An examination of Figure 2 shows that, should the sleeve valve 82 be moved to the right, piston 94 will have to move a corresponding distance to the right to stop the flow of fluid to the actuating piston 44. Conversely, the flow of fluid begins at a point further to the right as the piston 94 moves to the left. This action results in stabilization of the system at a higher flow level than previously. Thus it will be seen that a definite relationship exists between the position of sleeve valve 56 and the weight-spring combination of equilibrium established by governor 33.

Operation of the device is as follows: With the system in equilibrium, assume the pilot makes a request for increased fuel flow through a movement of the throttle to the left. This throttle movement results in a movement to the left of link 38, which at this moment is pivoting around point 99. This moves multiple spool piston 94 to the left, aligning chamber 98 with fluid inlet passage 72, ports 84 and 92, and passage 80, allowing fluid to flow into the left side of cylinder 42, forcing actuating piston 44 to the right. Movement of the piston translates through link 48 a corresponding movement to metering valve 46, thus allowing more fuel to flow through conduit 28. As the amount of fuel flow is increased, the angular velocity of flowmeter 32 and hence of flyball assembly 60 is increased, causing an increase in the force against spring 62, and a corresponding movement of link 38 to the right, thus stopping any further flow through servo valve 40 and bringing the system back into balance at a higher fuel flow. A request for decreased flow translates to link 38 and hence to piston 94, a motion to the right. This aligns chamber 96 with passage 72, port 84, port 90, and passage 78 in such manner as to cause fluid to flow into the right side of cylinder 42, thus forcing actuating piston 44, and metering valve 46, to the left, reducing the amount of fuel which can flow through conduit 28. This decrease is reflected in slowing of the flowmeter 32 and hence, a reduction in the force exerted by the flyball assembly 60 against spring 62. This reduction in force also causes link 38 to become stabilized at a position somewhat to the left of that which it occupied immediately after the throttle was moved, again stopping all fluid flow through servo valve 40.

Assume that an airplane using an afterburner with the present control makes a rapid increase in altitude. This may be compensated for by both temperature bellows 102 and pressure bellows 104. The temperature compensation for this condition will usually tend to increase fuel flow, while the pressure compensation will tend toward reducing the flow, but the overall effect will be to reduce flow, pressure variations causing much larger changes than temperature variations. Therefore the compensation differential 50 will translate through linkage 101 a motion sliding valve 82 to the left. Reference to Figure 2 shows that, with piston 94 left stationary, a movement of valve 82 to the left causes fluid to flow from passage 72, through port 84 into chamber 96, and then against the right side of piston 44. This, as previously indicated, tends to close valve 46, reducing the flow through conduit 28 and hence reducing the speed of flowmeter 32 and flyball assembly 60. As governor speed is reduced, spring 62 forces link 38 and piston 94 to the left, again cutting off the flow from passage 72 and stabilizing the system at a lower fuel flow. A decrease in altitude moves sliding valve 82 to the right which, in a manner analogous to that described above, causes fuel flow to be stabilized at a higher value.

It will be readily apparent to those skilled in the art that many variations may be made without departing from the teachings of the invention. While this invention is intended primarily as an afterburner control, it obviously may be used to control fluid flow in many applications. Having thus described the various features of the invention, what I claim as new and desire to secure by Letters Patent is:

1. In combination with an afterburner for a gas turbine engine, a fuel line connected to said afterburner, a metering valve in said line, a constant displacement rotative flowmeter in said line, a fly-weight governor device operatively connected to said flowmeter, a spring arranged to oppose the force exerted by said governor device, means for varying the force exerted by said spring, servo-means operatively connected to said spring, a compensating differential operatively connected to said servo means, temperature responsive means and pressure responsive means operating through said differential to vary the output of said servo means, and means operated by said servo means for positioning said metering valve.

2. In combination with an afterburner for a gas turbine engine, a fuel line connected to said afterburner, a metering valve in said line, a constant displacement rotative flowmeter in said line, a fly-weight governor device operatively connected to said flowmeter, a spring arranged to oppose the force exerted by said governor device, means for varying the force exerted by said spring, servo means operatively connected to said spring, compensating means for varying the output of said servo means in response to variations in certain engine operating parameters, and means operated by said servo means for positioning said metering valve.

3. A fuel metering control comprising a fuel line, a constant displacement rotative flowmeter in said line, a means for producing a flow demand signal operatively connected to said flowmeter, means for reflecting flow error from said demand signal, a servo valve means including a member operatively connected to said flow error reflecting means for controlling the flow from a source of fluid under pressure through said servo valve, means for varying the flow through said servo valve means in accordance with variations in certain operating parameters, conduits carrying fluid from said servo valve, means defining a chamber with which said conduits communicate, a piston within said chamber actuated by said fluid, and a metering valve in said fuel line actuated by said piston.

4. In combination with an afterburner for a gas turbine engine, a fuel line connected to said afterburner, a metering valve in said line, a constant displacement rotative flowmeter in said line, a fly-weight governor device operatively connected to said flowmeter, a spring arranged to oppose the force exerted by said governor device, means for varying the force exerted by said spring, servo means operatively connected to said spring, and means operated by said servo means for positioning said metering valve.

5. A fuel metering control comprising a fuel line, a constant displacement rotative flowmeter in said line, a flyweight governor device operatively connected to said flowmeter, a spring arranged to exert force against said governor, a throttle connected to vary the force exerted by said spring; a hydraulic servo valve operatively connected to said governor, said valve comprising a housing containing a chamber to which are connected a plurality of conduits, a hollow sleeve slidably placed within said chamber and having holes arranged to register with the conduits in said chamber, and a piston slidably positioned within said sleeve and operably connected to said spring and said governor; a source of fluid under pressure connected to said servo valve; a differential structure, a linkage system connected between said structure and said sleeve in said chamber, a temperature responsive means and a pressure responsive means connected to said structure for varying the position of said sleeve, a cylinder and an actuating piston in said cylinder, conduits leading to said cylinder from said servo valve, and a metering valve in said fuel line operated by said actuating piston.

6. A fuel metering control comprising a fuel line, a metering valve and constant displacement rotative flowmeter in said line, a flyweight governor device operatively connected to said flowmeter, a spring arranged to exert force against said governor, a throttle connected to vary the force exerted by said spring, a hydraulic servo valve including a housing having a plurality of ports, a spool valve member in said housing operatively connected to said governor, a sleeve in said housing having holes arranged to register with said ports, a differential mechanism connected to said sleeve, a source of fluid under pressure and conduits providing communication between said source and said ports, a temperature responsive means and a pressure responsive means connected to said differential, a closed cylinder and conduits communicating said cylinder with said servo valve, and an actuating piston in said cylinder connected to said metering valve and movable in response to the flow of fluid to said cylinder.

7. In a fuel metering system for an afterburner, a fuel line, a metering valve in said line, a rotative flowmeter in said line, means operatively connected to said flowmeter for producing a flow demand signal, means for reflecting flow error from said demand signal; a source of fluid under pressure; a servo valve comprising a housing, a plurality of inlet and outlet conduits connected to said housing, a sleeve with perforations arranged to register with said conduits, and a multiple spool piston within said sleeve operatively connected to said flow error reflecting means for controlling the flow of fluid among said conduits; a compensating differential operatively connected to said sleeve, means responsive to temperature and pressure variations operatively connected to said differential for modifying said fluid flow, a cylinder connected to said servo valve and a piston within said cylinder responsive to changes in the output of said servo valve connected to said metering valve.

8. A fuel metering control comprising a fuel line, a metering valve and a constant displacement rotative flowmeter in said line, a means producing a flow demand signal operatively connected to said flowmeter, means for reflecting flow error from said demand signal; a source of fluid under pressure; a hydraulic servo valve operatively connected to said flow error reflecting means and to said source, said valve consisting of a housing enclosing a chamber into which are connected a plurality of conduits some of which provide communication with said source, a hollow sleeve slidably placed within said chamber and having holes arranged to register with the conduits in said chamber, and a piston slidably positioned within said sleeve and operably connected to said flow error reflecting means for controlling the flow of fluid through said servo valve; means responsive to an operating condition connected to said sleeve for modifying the flow through said servo valve, a closed cylinder connected with said servo valve through a pair of said conduits, and an actuating piston in said cylinder operatively connected to said metering valve.

References Cited in the file of this patent

UNITED STATES PATENTS

| | | |
|---|---|---|
| 341,544 | Baker | May 11, 1886 |
| 1,718,673 | Wettstein | June 25, 1929 |
| 1,897,845 | Hilgers | Feb. 14, 1933 |
| 2,116,385 | Collingham | May 3, 1938 |
| 2,132,338 | Ziebolz | Oct. 4, 1938 |
| 2,185,970 | Ziebolz | Jan. 2, 1940 |
| 2,427,835 | Campbell | Sept. 23, 1947 |
| 2,474,441 | Sparrow | June 28, 1949 |
| 2,514,248 | Lombard et al. | July 4, 1950 |
| 2,566,373 | Redding | Sept. 4, 1951 |
| 2,581,276 | Mock | Jan. 1, 1952 |
| 2,599,507 | Wyckoff | June 3, 1952 |
| 2,698,654 | Jorgensen et al. | Jan. 4, 1955 |
| 2,705,047 | William et al. | May 29, 1955 |

FOREIGN PATENTS

| | | |
|---|---|---|
| 383,006 | Great Britain | Nov. 10, 1932 |
| 614,202 | Great Britain | Dec. 10, 1948 |